June 6, 1950     W. V. ARNETT     2,510,272

MULTIRANGE WAVE TRAP

Filed July 8, 1944

INVENTOR
WILLIAM V. ARNETT.

BY *H. S. Grover*

ATTORNEY

Patented June 6, 1950

2,510,272

UNITED STATES PATENT OFFICE 2,510,272

MULTIRANGE WAVE TRAP

William V. Arnett, Audubon, N. J., assignor to Radio Corporation of America, a corporation of Delaware Application July 8, 1944, Serial No. 544,105

6 Claims. (Cl. 178—44)

This invention relates to a new and useful multi-range wave trap, which is particularly adapted to ultra high frequency use.

An object of this invention is to provide a small simple efficient and frequency stable wave trap for ultra high frequency operation.

A feature of this invention is the novel arrangement of a cylindrical insulating tube, a support member, a variable air condenser and an inductance coil wound on the outside of the insulating tube.

Briefly the device of this invention comprises a movable electrode of the plunger air dielectric trimmer type condenser which is arranged to move inside a fixed metal tube. The metal tube is located within the insulating tube which is secured to a support member. Connected to an end of the fixed tube of the variable condenser electrode is an inductance coil which is positioned around the cylindrical insulating tube. The other end of the inductance coil connects to an insulated terminal mounted on a support member. The movable condenser electrode is in capacitive relationship with the fixed condenser electrode to vary the impedence thereof.

Although wave traps are old in the art, they do not all provide efficient and frequency stable operation when used in ultra high frequency circuits.

This invention is particularly adapted to provide an efficient wave trap, which will be stable at the ultra high frequencies, regardless of temperature changes. The wave trap of this invention may be employed to tune a radio transmitter circuit over a considerably wide frequency range and is simple in construction and rugged in operation. The device of this invention may be employed equally as well in a receiving circuit as in a transmitting circuit.

This invention will best be understood by referring to the accompanying drawing, in which.

Figure 1:
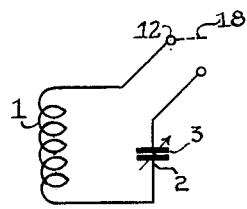
Fig. 1 is a circuit diagram of the wave trap of this invention.

Referring now in detail to the circuit diagram shown by Fig. 1 of the drawing, the inductance coil 1 is shown as being connected at one end to a fixed electrode 2 of an air variable condenser. The condenser variable electrode 3 includes a metallic rod which is arranged to telescope within the electrode 2. The circuit arrangement of the inductance and condenser electrodes is such as to provide either a parallel tuned circuit or series tuned circuit arrangement.

Figure 2:
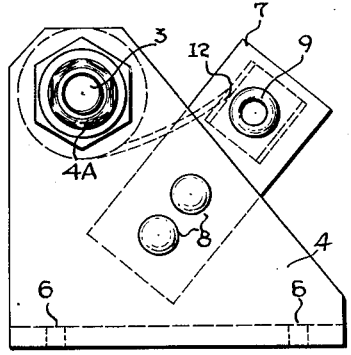
Fig. 2 is an end view of the wave trap of this invention.
Figure 3:
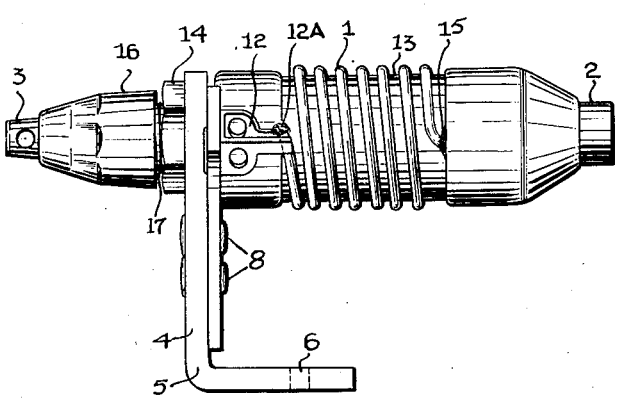
Fig. 3 is a side elevation of Fig. 2.
Figure 4:
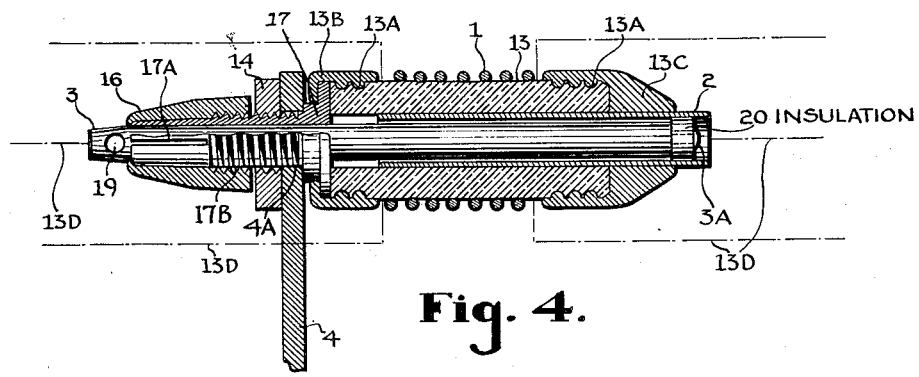
Fig. 4 is a longitudinal section of Fig. 3.

The structural details of the wave trap of this invention is shown in detail by Figs. 2, 3 and 4 of the drawing. They comprise a metallic bracket member 4, which is bent at right angles at 5, to provide a foot or mounting portion. A non-circular aperture 4A is provided to retain the wave trap unit. The mounting portion of bracket 4 is provided with tapped holes 6 for securing the same to any suitable chassis or other electrical structure (not shown). An insulating terminal board 7 is secured to the bracket member 4 by means of a pair of rivets 8. A single terminal eyelet 9 is fastened to terminal board 7 and secures a U-shaped terminal clip 12 thereto. An insulating tube 13 is provided with corrugated ends 13A to grip with metal ends 13B and 13C, which are moulded on. The metal ends 13B and 13C are moulded in a split mould of any suitable size and indicated by the dot and dash lines 13D. The preferred metal is a solder comprising about 40 percent tin and 60 percent lead. The moulded ends also retain tube 2 and a metallic bushing 17 in place, as shown by Fig. 4. Bushing 17 is threaded and split at 17A to provide locking means for rod 3 by the tightening of a metal bushing nut or chuck 16. A flattened portion 17B on bushing 17 prevents the turning of the wave trap unit as it is mounted in the non-circular aperture 4A, in bracket member 4. In order to provide proper insulation it will be noted that the metallic electrode tube 2 does not extend all the way through insulating tube 13. The insulating tube 13 together with the metallic bushing 17 is secured to member 4 by means of a threaded nut 14. At a point 15 the inductance coil 1 is soldered to the metal end 13C which connects the fixed electrode 2. The inductance 1 consists of seven or any desired number of spaced turns of heavy copper enameled wire which are wound around the insulating tube 13 to give the proper inductance. The turns are secured in place by a coating of any suitable insulating liquid such as styrol. The free end of coil 1 is soldered to clip 12 at 12A and serves as one terminal of the wave trap. The other terminal of the wave trap is that of the rod 3, which in turn is electrically connected to the bracket 4. The impedance of the device is varied by means of telescoping the metallic rod 3 which forms the variable condenser electrode within the ceramic tube 13. Any suitable insulated tool (not shown) may be inserted in hole 19 to vary its capacity. When the proper impedance of the device is obtained the rod 3 is locked in position by means of a threaded bushing nut 16, which rotates around the threaded bushing 17.

One end of rod 3 has a stud portion 3A which retains an insulating washer 20 of ceramic material. Washer 20 is to prevent a short circuit between rod 3 and tube 2, and is made larger in diameter than rod 3, but of such size as will telescope within tube 2. The end of the stud portion is peaned over as shown to prevent washer 20 from coming off when rod 3 is moved.

In the operation of this device the proper connections are made between one end of coil 1 at terminal clip 12, and the variable electrode 3 at bracket 4; that is, if it is desired to be a series tuned circuit. If a parallel tuned circuit arrangement is desired, a connecting link 18 (shown by a dotted line in Fig. 1) is connected between the terminal clip 12 and bracket 4. The incoming terminal connections are made from clip 12 and the metal tube 2 when using link 18 for the parallel tuned circuit. The proper impedance is obtained by a movement of the variable electrode 3, which is in capacitive relationship with the fixed electrode 2.

While I have described a device for carrying my invention into effect, it will be apparent to one skilled in the art that my invention is by no means limited to the particular device shown and described, but that many modifications may be made without departing from the scope of the invention.

What I claim is:

1. A high frequency wave trap comprising a metallic angle-shaped support bracket, an insulating cylinder having corrugated ends, a helical space wound inductive coil wound outside of said insulating cylinder, a moulded metallic end secured to each one of the corrugated ends of said insulating cylinder, one of said metallic ends arranged to support said insulating cylinder to said metallic support bracket, a fixed cylindrical condenser electrode located inside of said insulating cylinder and electrically connected to one end of said coil by said moulded end, a terminal member insulatingly secured to said support bracket and electrically connected to the other end of said coil, and a variable condenser electrode arranged to move within said fixed cylindrical electrode to vary the impedance of said wave trap.

2. A high frequency multi-range wave trap comprising an insulating hollow cylinder, metallic ends for partly closing said hollow cylinder, a support member for said insulating cylinder, an inductive coil located outside of said insulating cylinder, a fixed condenser electrode located inside of said insulating cylinder and electrically connected to one end of said coil by one of said metallic ends, the other one of said metallic ends having threaded means located outside of said support member, a threaded hollow chuck for said threaded means, and a variable condenser electrode in the interior of said chuck, said chuck acting to lock said variable condenser electrode in a desired capacitive relationship with said first mentioned electrode.

3. A high frequency wave trap comprising an insulating hollow cylinder, metallic ends for partly closing said hollow cylinder, a terminal member, a space wound inductive coil wound outside of said insulating cylinder, a fixed condenser tubular electrode located within said insulating cylinder and electrically connected to one end of said coil by said one of the metallic ends, the other end of said coil being electrically connected to said terminal member by the other one of said metallic ends, a variable rod condenser electrode having a smaller outside diameter than the inside diameter of said fixed condenser tubular electrode, and an insulating end sleeve attached to one end of said variable rod condenser electrode so as to move within the inside of the fixed condenser tubular electrode, so that said variable rod condenser electrode may move within said fixed tubular electrode to be in capacitive relationship therewith to vary the impedance of said wave trap.

4. A high frequency wave trap comprising a metallic support bracket, a terminal member, an insulating hollow cylinder having corrugated ends, a helical space wound inductive coil wound outside of said insulating cylinder, a moulded metallic end secured to each one of the corrugated ends of said insulating cylinder, one of said metallic ends being arranged to support said insulating cylinder to said metallic support bracket, a fixed cylindrical condenser electrode located inside of said insulating cylinder and electrically connected to one end of said coil by said moulded end, said terminal member insulatingly secured to said support bracket and electrically connected to the other end of said coil, and a variable condenser electrode arranged to move within said fixed cylindrical electrode to vary the impedance of said wave trap.

5. A high frequency wave trap comprising an insulating hollow cylinder, an angle-shaped support member, metallic ends for partly closing said hollow cylinder, a terminal member secured to said support member, a space wound metallic coil wound outside of said insulating cylinder, a fixed condenser tubular electrode located within said insulating cylinder and electrically connected to one end of said coil by one of the metallic ends, the other end of said coil being electrically connected to said terminal member, said other one of said metallic ends having threaded means located outside said support member, a threaded hollow chuck for said threaded means and a variable condenser electrode in the interior of said chuck, said chuck acting to lock said variable condenser electrode in a desired capacitive relationship with said first mentioned electrode.

6. A high frequency wave trap comprising an insulating hollow cylinder, an angle-shaped metallic support member, metallic ends for partly closing said hollow cylinder, a terminal member insulatingly secured to said support member, a space wound metallic coil wound outside of said insulating cylinder, a fixed condenser tubular electrode located within said insulating cylinder and electrically connected to one end of said coil by one of the metallic ends, the other end of said coil being electrically connected to said terminal member, said other one of said metallic ends having threaded means located outside said support member, a threaded hollow chuck for said threaded means and a variable rod condenser electrode positioned in the interior of said fixed tubular electrode, said threaded hollow chuck acting to lock said variable electrode in a desired capacitive relationship with said first mentioned electrode.

WILLIAM V. ARNETT.

REFERENCES CITED

The following references are of record in the file of this patent:

UNITED STATES PATENTS

| Number | Name | Date |
| --- | --- | --- |
| 1,913,532 | Bohner | June 13, 1933 |
| 2,014,422 | Carter | Sept. 17, 1935 |
| 2,028,596 | Franklin et al. | Jan. 21, 1936 |
| 2,209,626 | Larkin | July 30, 1940 |
| 2,422,458 | Amy et al. | June 17, 1947 |